US009652745B2

(12) United States Patent
Taylor et al.

(10) Patent No.: US 9,652,745 B2
(45) Date of Patent: May 16, 2017

(54) MODEL-DRIVEN EVALUATOR BIAS DETECTION

(71) Applicant: HireVue, Inc., South Jordan, UT (US)

(72) Inventors: Benjamin Taylor, Lehi, UT (US); Loren Larsen, Lindon, UT (US)

(73) Assignee: HIREVUE, INC., South Jordan, UT (US)

( * ) Notice: Subject to any disclaimer, the term of this patent is extended or adjusted under 35 U.S.C. 154(b) by 0 days.

(21) Appl. No.: 14/543,776

(22) Filed: Nov. 17, 2014

(65) Prior Publication Data

US 2015/0371191 A1    Dec. 24, 2015

Related U.S. Application Data

(60) Provisional application No. 62/015,306, filed on Jun. 20, 2014.

(51) Int. Cl.
*G06Q 10/10* (2012.01)

(52) U.S. Cl.
CPC ................ *G06Q 10/1053* (2013.01)

(58) Field of Classification Search
USPC ........................... 705/321, 347, 327
See application file for complete search history.

(56) References Cited

U.S. PATENT DOCUMENTS

| | | | |
|---|---|---|---|
| 6,442,519 B1* | 8/2002 | Kanevsky | G10L 15/07 704/243 |
| 7,035,914 B1* | 4/2006 | Payne | G08B 25/085 340/7.29 |
| 7,203,346 B2* | 4/2007 | Kim | G06K 9/00281 351/209 |
| 8,027,521 B1* | 9/2011 | Moon | G06K 9/00288 382/118 |
| 8,351,647 B2* | 1/2013 | Sharma | G06Q 30/02 382/103 |

(Continued)

FOREIGN PATENT DOCUMENTS

WO    2015/195841 A1    12/2015

OTHER PUBLICATIONS

John A. Hartigan and Manchek A. Wong. Algorithm as 136: A k-means clustering algorithm. Applied Statistics, pp. 100-108, 1979. http://www.labri.fr/perso/bpinaud/userfiles/downloads/hartigan_1979_kmeans.pdf.*

(Continued)

*Primary Examiner* — Lynda Jasmin
*Assistant Examiner* — Johnathan Lindsey, III
(74) *Attorney, Agent, or Firm* — Lowenstein Sandler LLP

(57) ABSTRACT

A method for detecting bias in an evaluation process is provided. The method includes operations of receiving evaluation data from a candidate evaluation system. The evaluation data is provided by a set of evaluators based on digital interview data collected from evaluation candidates. The operations of the method further include extracting indicators of characteristics of the evaluation candidates from the digital interview data, classifying the evaluation candidates based on the indicators extracted from the digital interview data, and determining whether the evaluation data indicates a bias of one or more evaluators with respect to a classification of the evaluation candidates.

18 Claims, 9 Drawing Sheets

(56) References Cited

U.S. PATENT DOCUMENTS

| | | | | |
|---|---|---|---|---|
| 8,582,807 B2* | 11/2013 | Yang | G06K 9/00248 | 382/103 |
| 8,732,176 B2* | 5/2014 | Chow | G06Q 30/02 | 707/748 |
| 8,805,489 B1* | 8/2014 | Ofek | A61B 5/04 | 600/544 |
| 9,047,504 B1* | 6/2015 | Ramaswamy | G06K 9/00228 | |
| 9,176,987 B1* | 11/2015 | Peng | G06F 17/30253 | |
| 2002/0046199 A1* | 4/2002 | Scarborough | G06Q 10/063 | 706/21 |
| 2002/0055866 A1* | 5/2002 | Dewar | G06Q 10/063 | 112 705/7.38 |
| 2002/0122659 A1* | 9/2002 | McGrath | G06F 17/30784 | 386/224 |
| 2005/0114279 A1* | 5/2005 | Scarborough et al. | | 706/21 |
| 2007/0088601 A1* | 4/2007 | Money et al. | | 705/10 |
| 2010/0124378 A1* | 5/2010 | Das | G06F 17/30247 | 382/225 |
| 2011/0040720 A1* | 2/2011 | Zangwill | G06N 5/04 | 706/52 |
| 2011/0299764 A1* | 12/2011 | Snoek | G06F 17/30256 | 382/159 |
| 2012/0197816 A1* | 8/2012 | Short et al. | | 705/347 |
| 2012/0317046 A1* | 12/2012 | Myslinski | G06Q 30/02 | 705/329 |
| 2013/0066769 A1* | 3/2013 | Trenchard et al. | | 705/39 |
| 2013/0144813 A1* | 6/2013 | Sengupta | G06N 5/022 | 706/12 |
| 2013/0223694 A1* | 8/2013 | Ricanek, Jr. | G06K 9/00221 | 382/118 |
| 2014/0040173 A1* | 2/2014 | Sagher | G06N 99/005 | 706/12 |
| 2014/0219526 A1* | 8/2014 | Linguraru | G06K 9/00281 | 382/128 |

OTHER PUBLICATIONS

Bin Zhang, Meichun Hsu, Umeshwar Dayal. K-Harmonic means—a data clustering algorithm. Hewlett-Packard Labs Technical Report HPL-1999-124, 1999. http://citeseerx.ist.psu.edu/viewdoc/download?doi=10.1.1.42.5552&rep=rep1&type=pdf.*

Bing Liu, "Chapter 4: Unsupervised Learning Lecture Slides." Fall 2005. http://www.cs.uic.edu/~liub/teach/cs583-fall-05/C5583-unsupervised-learning.ppt.*

EEOC, "Uniform Guidelines on Employee Selection Procedures." Aug. 2000. http://www.uniformguidelines.com/uniformguidelines.html.*

EIC 3600 NPL Search Report.*

EEOC ("Uniform Employee Selection Guidelines Interpretation and Clarification (Questions and Answers)," http://www.uniformguidelines.com/questionandanswers.html. Aug. 16, 2000.).*

Leo Breiman. Random forests. Machine learning, 45(1):5-32, 2001.

Timothy F Cootes, Gareth J Edwards, Christopher J Taylor, et al. Active appearance models. IEEE Transactions on pattern analysis and machine intelligence, 23(6):681-685, 2001.

Martin T Hagan, Howard B Demuth, Mark H Beale, et al. Neural network design. Pws Pub. Boston, 1996.

John A Hartigan and Manchek A Wong. Algorithm as 136: A k-means clustering algorithm. Applied statistics, pp. 100-108, 1979.

Marti A. Hearst, ST Dumais, E Osman, John Platt, and Bernhard Scholkopf. Support vector machines. Intelligent Systems and their Applications, IEEE, 13(4):18-28, 1998.

Matthew Turk and Alex Pentland. Eigenfaces for recognition. Journal of cognitive neuro-science, 3(1):71-86, 1991.

Paul Viola and Michael J Jones. Robust real-time face detection. International journal of computer vision, 57(2):137-154, 2004.

Fengqin Yang, Tieli Sun, and Changhai Zhang. An efficient hybrid data clustering method based on k-harmonic means and Particle Swarm Optimization. Expert Systems with Applications, 36(6):9847-9852, 2009.

Bin Zhang, Meichun Hsu, and Umeshwar Dayal. K-harmonic Means—A Data Clustering Algorithm. Hewlett-Packard Labs Technical Report HPL-1999-124, 1999.

International Search Report and Written Opinion mailed on Sep. 21, 2014 for application No. PCT/US2015/36298.

* cited by examiner

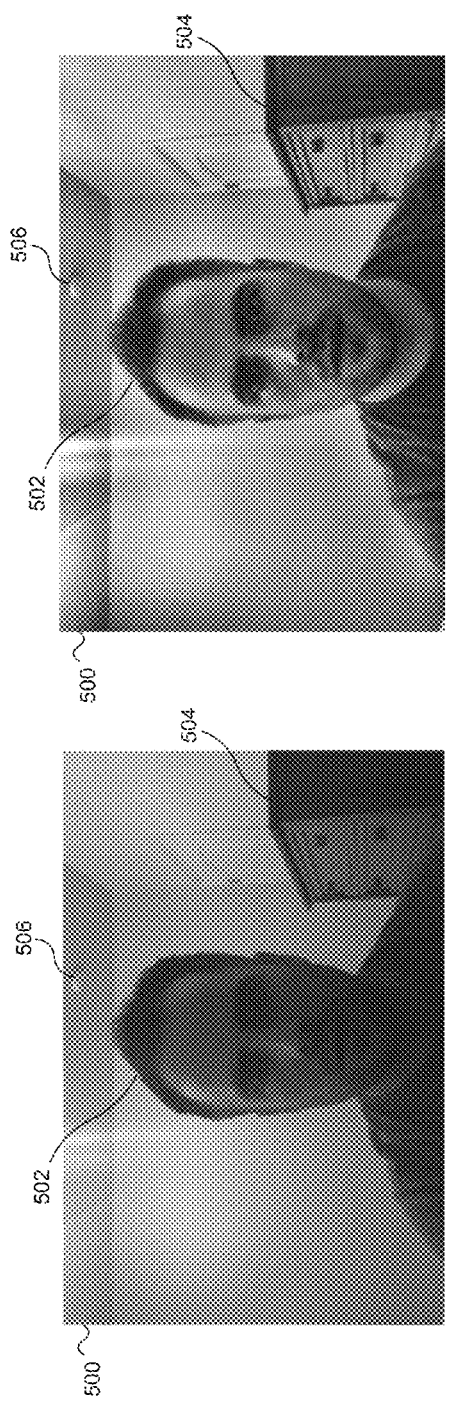
FIG. 5A
FIG. 5B
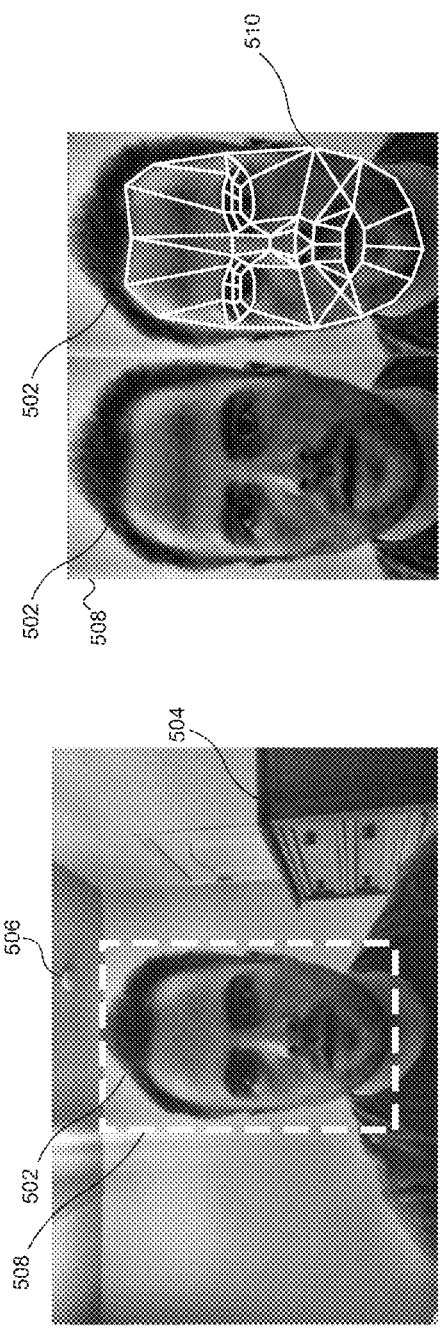
FIG. 5C
FIG. 5D

MODEL-DRIVEN EVALUATOR BIAS DETECTION

RELATED APPLICATIONS

This application claims the benefit of U.S. Provisional Application No. 62/015,306 filed Jun. 20, 2014, and entitled "Model Driven Evaluator Bias Detection," the entirety of which is incorporated herein by reference.

BACKGROUND

Finding and hiring employees is a task that impacts most modern businesses. It is important for an employer to find employees that "fit" open positions. The processes associated with finding employees that fit well can be expensive and time consuming for an employer. Such processes can include evaluating numerous resumes and cover letters, telephone interviews with candidates, in-person interviews with candidates, drug testing, skill testing, sending rejection letters, offer negotiation, training new employees, etc. A single employee candidate can be very costly in terms of man-hours needed to evaluate and interact with the candidate before the candidate is hired.

Computers and computing systems can be used to automate some of these activities. For example, many businesses now have on-line recruiting tools that facilitate job postings, resume submissions, preliminary evaluations, etc. Additionally, some computing systems include functionality for allowing candidates to participate in "virtual" on-line interviews.

The job of interviewers and candidate reviewers is to determine if candidates are skilled and have the qualifications required for a particular job. In the process of doing this, they ideally compare and contrast the qualifications of candidates. Over the years there have been numerous documented instances in which candidates have been selected based on qualities or characteristics other than the skills and qualifications required for a particular job. In the Unites States and other jurisdictions across the world, when candidates are chosen on the basis of gender, race, religion, ethnicity, sexual orientation, disability, or other categories that are protected to some degree by law, penalties may be imposed on entities for such practices. The penalties may be financial and may also include requirements for monitoring of hiring practices to ensure violations are not repeated. Additionally, when candidates are selected based on non-work related characteristics, the best candidates for the position may be overlooked, such that the quality of an entity's workforce is compromised. While efforts have been made in the past to avoid discriminatory practices in hiring, these efforts have not been entirely satisfactory.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 5A, 5B, 5C, and 5D illustrate a series of images from a processing of characteristic extraction from video frames, according to some embodiments.

Figure 1:
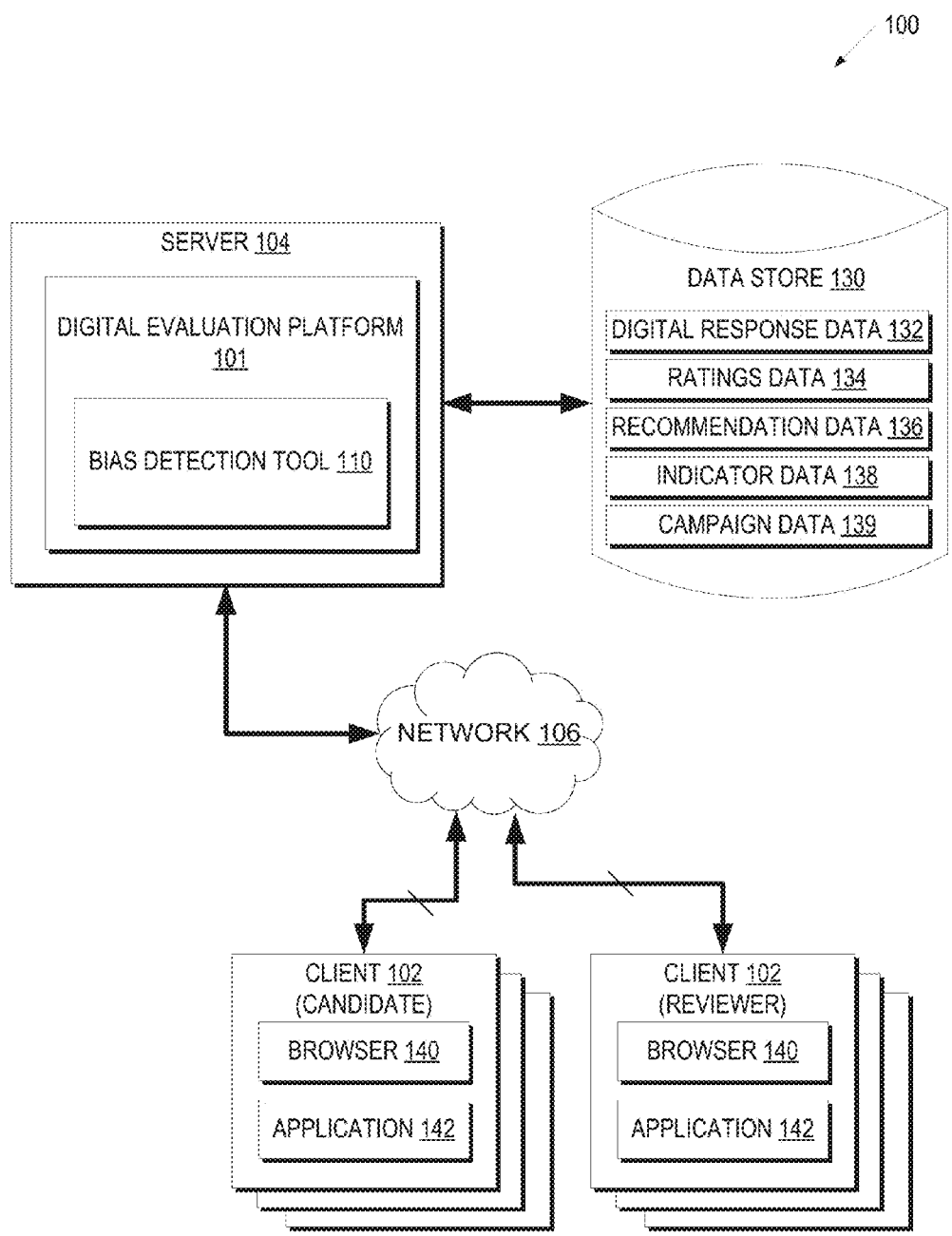
FIG. 1 is a block diagram of an exemplary network architecture in which embodiments of a bias detection tool may operate, according to some embodiments.

Some aspects of these figures may be better understood by reference to the following Detailed Description.

DETAILED DESCRIPTION

Methods and systems for bias detection to improve the reviewing and assessment of digital interviews and other digitally-capture evaluation processes are described. In the following description, numerous details are set forth. In one embodiment, a bias detection tool receives a set of evaluation data from a candidate evaluation system. The evaluation data is generated by a set of evaluators based on digital interview data from evaluation candidates. The bias detection tool extracts characteristics of the evaluation candidates from the digital interview data, classifies the evaluation candidates based on the characteristics of the candidate extracted from the digital interview data, and determines whether the evaluation data indicates a bias of one or more evaluators of the set of evaluators with respect to one or more of the extracted characteristics. The extraction of characteristics may result in a set of unknown characteristics as the result of an unsupervised clustering algorithm. Or the extraction and classifying may be performed by a model that is trained with a set of known information. If a bias in evaluation is determined to be present, the bias detection tool may notify an evaluation campaign manager, such as a human resources director. This determination may be made before the results of the bias rise to the level of justifying legal action, allowing companies and other organizations to take action against conscious or unconscious bias at an earlier stage. This bias detection tool may also assist companies that are under court-directed orders to eliminate bias in hiring practices.

In some instances in this description, well-known structures and devices are shown in block diagram form, rather than in detail, in order to avoid obscuring the embodiments of the present disclosure. It will be apparent, however, to one of ordinary skill in the art having the benefit of this disclosure, that embodiments of the present disclosure may be practiced without these specific details.

With the ability to recruit for positions nationally and even internationally using the Internet, the number of qualified candidates applying for a given job can be expensive and time consuming to evaluate. For more technical positions, subject-matter experts are used for evaluation and screening of candidates rather than focusing on regular job duties. With the adoption of digital video interviewing, the time needed to evaluate candidates is reduced, however, the problem of having too many candidates to filter through still remains.

Digital interviews or other evaluations, such as a pitch for investment funding or a grant, an admissions interview, job performance evaluations, or other presentation meriting assessment and comparison may include responding to a series of prompts or questions. The responses to those prompts by a person or group being evaluated can be captured as digital data and later reviewed and rated by an evaluator. Because there are many candidates, a large data set is collected that includes the recorded responses for each candidate. When evaluators later view the recorded responses, the evaluators may provide ratings for each response or for some responses and may also provide recommendations as to the final evaluation decision. For example, evaluators may rate responses on a scale, such as zero to five, and may provide recommendations, such as "yes," "no," "maybe," etc. When ratings and/or recommendations are provided in a non-quantitative format, those ratings and recommendations may be converted to numerical values. For example, the "yes" may be converted to a one, the "no" may be converted to a zero, and the "maybe" may be converted to one-half. This may facilitate the application of statistical models and machine-learning in the assessment and selection of candidates.

Because the evaluators are tasked with providing ratings for candidates' responses, there is a degree of subjectivity included in each rating. This subjectivity on the part of evaluators may, in some cases, be impacted by the evaluators' conscious and unconscious biases. For example, an evaluator may be biased against candidates with an accent that indicates a certain ethnicity. Or an evaluator may be biased against a candidate, due to that candidates perceived race, religion, gender, disability, etc. This bias may be reflected in the evaluator's ratings of candidates' responses and in the evaluator's recommendations. If the magnitude of the impact is great enough, a violation of law may be the result. However, many companies are committed to eliminating any such bias in their hiring practices and may want to be apprised of any bias at all, even if the bias results in disparate impact that is less than any limits enforced in a given jurisdiction.

By accessing volumes of digital interview data and evaluation data, that data may be searched and analyzed to monitor for and detect biases in the selection process. To facilitate this, characteristics of candidates may be extracted by machines from the digital interview data. In some instances, candidates may provide information that may be useful in assessing evaluator bias. For example, candidates may provide information regarding race, religion, gender, sexual orientation, etc. In some evaluations, such information may be requested as part of the evaluation process. Because of sensitivities and concerns surrounding the use of such information some candidates may decline to provide that information. In addition to using explicitly provided information to extract characteristics of the evaluation candidates, machine-learning may be applied to audio and/or video information provided in the digital interview data to identify indicators of such characteristics. In some embodiments, candidates may be presented with a user interface element by which the candidate may request to opt-out of any such characteristic assessment. In such circumstances, the characteristics of the candidate or candidates choosing to opt-out may not be collected. In such circumstances, the detection of bias may become more difficult as less information is available to enable the detection to be performance.

Embodiments described herein can be used to address issues of bias in the selection of candidates for a given position. The embodiments, may allow users to address and eliminate biases in order to minimize their impact. By eliminating the impact of biases, the best candidates may be selected. In circumstances in which unlawful biases in selection have been identified, the embodiments described herein may allow for more accurate monitoring of the hiring process and may be useful in demonstrating a required change in practices in some instances.

FIG. 1 is a block diagram of a network architecture 100 in which embodiments of a bias detection tool 110 may operate. The network architecture 100 may include multiple client computing systems 102 ("clients 102") coupled to a server computing system 104 via a network 106 (e.g., a public network such as the Internet, a private network such as a local area network (LAN), or a combination thereof). The network 106 may include the Internet and network connections to the Internet. Alternatively, the server 104 and the clients 102 may be located on a common LAN, personal area network (PAN), campus area network (CAN), metropolitan area network (MAN), wide area network (WAN), wireless local area network, cellular network, virtual local area network, or the like. The server computing system 104 (also referred to herein as server 104) may include one or more machines (e.g., one or more server computer systems, routers, gateways) that have processing and storage capabilities to provide the functionality described herein. The server computing system 104 may execute a predictive model, referred to herein as a bias detection tool 110. The bias detection tool 110 can perform various functions as described herein and may include several subcomponents and features as described in more detail below with respect to FIG. 2.

The bias detection tool 110 can be implemented as a part of a digital evaluation platform 101, such as the digital interviewing platform developed by HireVue, Inc., of South Jordan, Utah, or may be implemented in another digital evaluation platform such as an investment evaluation platform or an admission evaluation platform. While many of the examples provided herein are directed to an employment/hiring context, the principles and features disclosed herein may be equally applied to other contexts and so such are within the scope of this disclosure as well. For example, the principles and features provided herein may be applied to a job performance evaluation, an evaluation of a sales pitch, an evaluation of an investment pitch, etc.

The bias detection tool 110 can be implemented as a standalone predictive model that interfaces with the digital evaluation platform 101 or other systems. It should also be noted that in this embodiment, the server computing system 104 implements the bias detection tool 110, but one or more of the clients may also include client modules of the bias detection tool 110 that can work in connection with, or independently from the functionality of the bias detection tool 110 as depicted on the server computing system 104.

The client computing systems 102 (also referred to herein as "clients 102") may each be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, wearable computing devices or the like. The clients 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 140 and one or more applications 142. The clients 102 may include a microphone and a video camera to record responses as digital interview data. For example, the clients 102 may record and store video responses and/or stream or upload the recorded responses to the server 104 for capture and storage. In one embodiment, the clients 102 access the digital evaluation platform 101 via the browser 140 to record responses. The recorded responses may include audio, video, digital data, such as code or text, or combinations thereof. In such embodiments, the digital evaluation platform 101 is a web-based application or a cloud computing system that presents user interfaces to the clients 102 via the browser 140.

Similarly, one of the applications 142 can be used to access the digital evaluation platform 101. For example, a mobile application (referred to as "app") can be used to access one or more user interfaces of the digital evaluation platform 101. The digital evaluation platform 101 can be one or more software products that facilitate the digital evaluation process. For example, in some cases, the one of the clients 102 is used by a candidate (or interviewee) to conduct a digital interview. The digital evaluation platform 101 can capture digital response data 132 from the candidate and store the data in a data store 130. The digital response data 132 may include data uploaded by the candidate, audio captured during the interview, video captured during the interview, data submitted by the candidate before or after the interview, or the like. As illustrated herein, the digital response data 132 includes at least recorded response in the form of video captured during the interview. This digital response data 132 may be used to identify multiple indicators for use in extracting characteristics of the candidates as is discuss in more detail below.

The clients 102 can also be used by a reviewer or evaluator to review, screen, and select candidates and their associated response data. The reviewer can access the digital evaluation platform 101 via the browser 140 or the application 142 as described above. The user interfaces presented to the reviewer by the digital evaluation platform 101 are different than the user interfaces presented to the candidates. Similarly, user interfaces presented to personnel that supervise the evaluators (herein a supervisor) may be different, as well, and may present more comprehensive information. The user interfaces presented to the supervisor permit the supervisor to access the digital response data 132 for reviewing and selecting the candidates based on the ratings and recommendations of evaluators and also to receive information regarding potential biases detected by the bias detection tool 110. The bias detection tool 110 can be activated by the supervisor (or automatically activated when so configured) to identify whether bias is likely present in a given evaluation campaign. The bias detection tool 110 may be able to provide information as to whether or not individual evaluators exhibit one or more biases and what those biases are, as indicated by the assessment of information stored in the data store 130.

The data store 130 can represent one or more data repositories on one or more memory devices. The data store 130 may be a database or any other organized collection of data. The data store 130 may store the digital response data 132, evaluation ratings data 134, evaluation recommendation data 136, indicator data 138, and campaign data 139. The indicator data 138 may include information regarding multiple indicators that may be used in estimating the characteristics of a candidate. For example, where the candidate has provided explicit information regarding information such as age, race, ethnicity, religion, gender, sexual orientation, disability, socio-economic status of the candidate or familial socio-economic status, citizenship status, association with institutions such as schools, charities, political organization, etc., that information may be stored in the indicator data 138. Also, where machine-learning algorithms are used to estimate such characteristics from audio and video components of the digital response data 132, as is discussed below in more detail, the estimated or predicted characteristics may be stored in the indicator data 138.

In the depicted embodiment, the server computing system 104 may execute the digital evaluation platform 101, including the bias detection tool 110 for detecting potential bias in the evaluation process. The server 104 can include web server functionality that facilitates communication between the clients 102 and the digital evaluation platform 101 to conduct digital interviews or review digital interviews, including recorded responses, as described herein. Alternatively, the web server functionality may be implemented on a machine other than the machine running the bias detection tool 110. It should also be noted that the functionality of the digital evaluation platform 101 for recording the digital response data 132 can be implemented on one or more servers 104 and the functionality of the digital evaluation platform 101 can be implemented by one or more different servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

Figure 2:
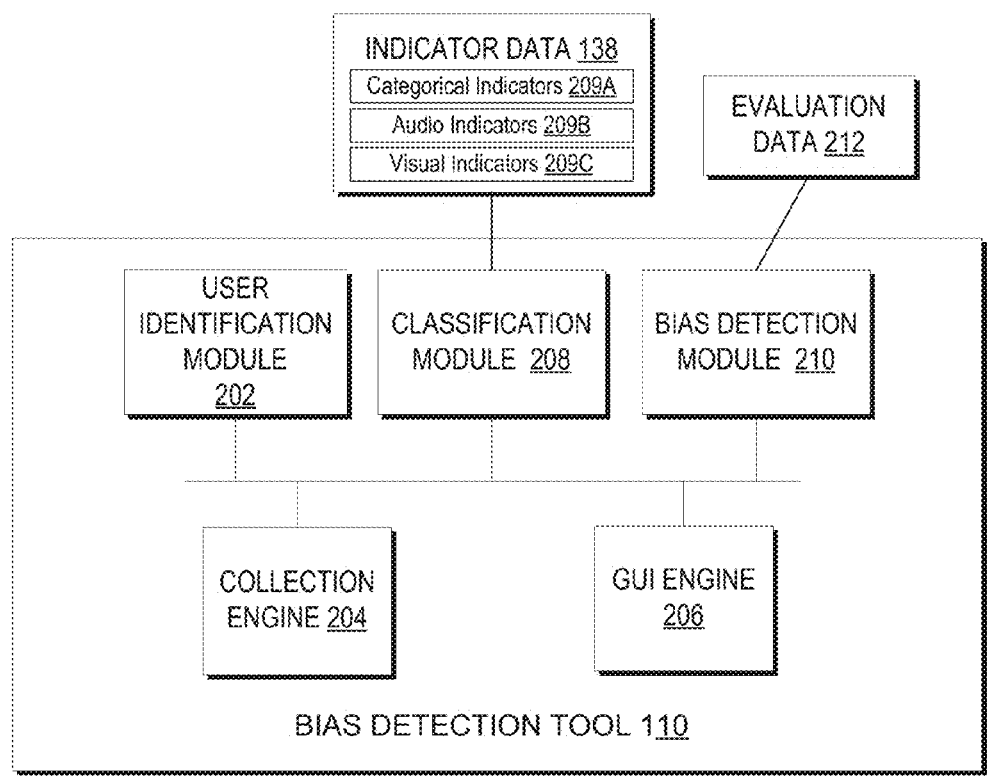
FIG. 2 is a block diagram of a bias detection tool according to some embodiments.

FIG. 2 is a block diagram of the bias detection tool 110 according to some embodiments. The bias detection tool 110 can be implemented as processing logic comprising hardware (circuitry, dedicated logic, etc.), software (such as is run on a general purpose computing system or a dedicated machine), firmware (embedded software), or any combination thereof. In the depicted embodiment, the evaluation review tool 110 includes a user identification module 202, a collection engine 204, a graphical user interface (GUI) engine 206, a classification module 208, and a bias detection module 210. The components of the evaluation review tool 110 may represent modules that can be combined together or separated into further modules, according to some embodiments.

The user identification module 202 may be used to identify users of the digital evaluation platform 101 and to ensure that users may only access data they are authorized to access. To do this, the user identification module 202 may include or have access to multiple profiles for the users that accesses the bias detection 110. For example, access to the bias detection tool 110 may be limited to supervisors that have a role in overseeing evaluation campaigns. In some instances, the supervisors may include court-appointed supervisors, appointed as the result of a lawsuit or regulatory proceeding. A supervisor may access the digital evaluation platform 101 and be prompted to enter credentials that, when verified, permit the supervisor to access multiple campaigns or a limited set of campaigns. For example, the supervisor may be a hiring manager at an information technology (IT) firm that is seeking to fill positions in IT administration, sales, and human resources and seeking to avoid or eliminate bias in the filling of those positions. The user identification module 202 may identify the supervisor to the digital evaluation platform 101.

The collection engine 204 may communicate with various processors and data stores over one or more communication channels to retrieve data for use by the bias detection tool 110. For example, when a supervisor wants to monitor a campaign for bias, the decision maker may select the campaign using a user interface element. If the supervisor is concerned that bias may have impacted multiple campaigns, the supervisor may select multiple campaigns. Upon selection of the campaign or campaigns, the collection engine 204 may retrieve associated evaluation data 212. For example, the collection engine 204 may communicate with the data store 130 of FIG. 1 to retrieve ratings data 134 and recommendation data 136 associated with the campaign. The collection engine 204 may also retrieve indicator data, such as indicator data 138 from the data store 130. As shown in FIG. 2, the indicator data 138 may include categorical indicators 209A, audio indicators 209B, and visual indicators 209C. The categorical indicators 209A may be obtained the information explicitly provided by the candidates that may indicate that the candidate may be associated with one or more categories of groups that may be subject to bias. For example, if a candidate indicates that he is male, Jewish, and Cuban-American, the categorical indicators 209A permit the bias detection tool 110 to access and process that information. Other categorical indicators 209A associated with a candidate may include the name of the candidate, the region or area in which the candidate resides, and/or any other candidate information that may increase the probability of correctly classifying the candidate.

Figure 3A:
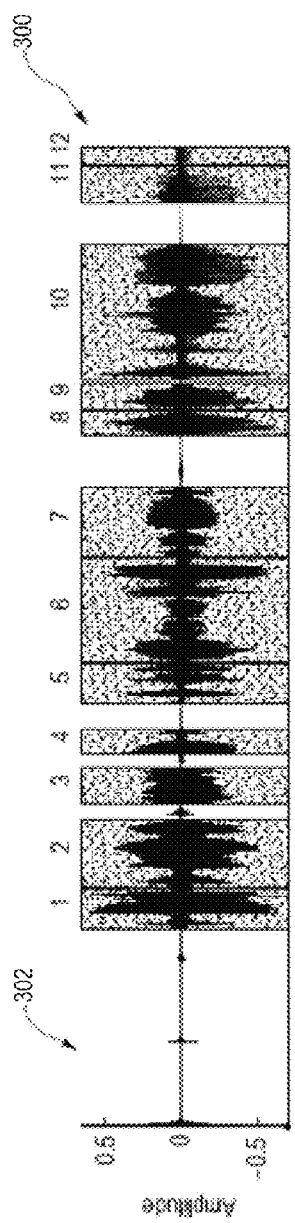
FIG. 3A-B illustrate graphs of processed audio signals for utterance identification according to some embodiments.
Figure 3B:
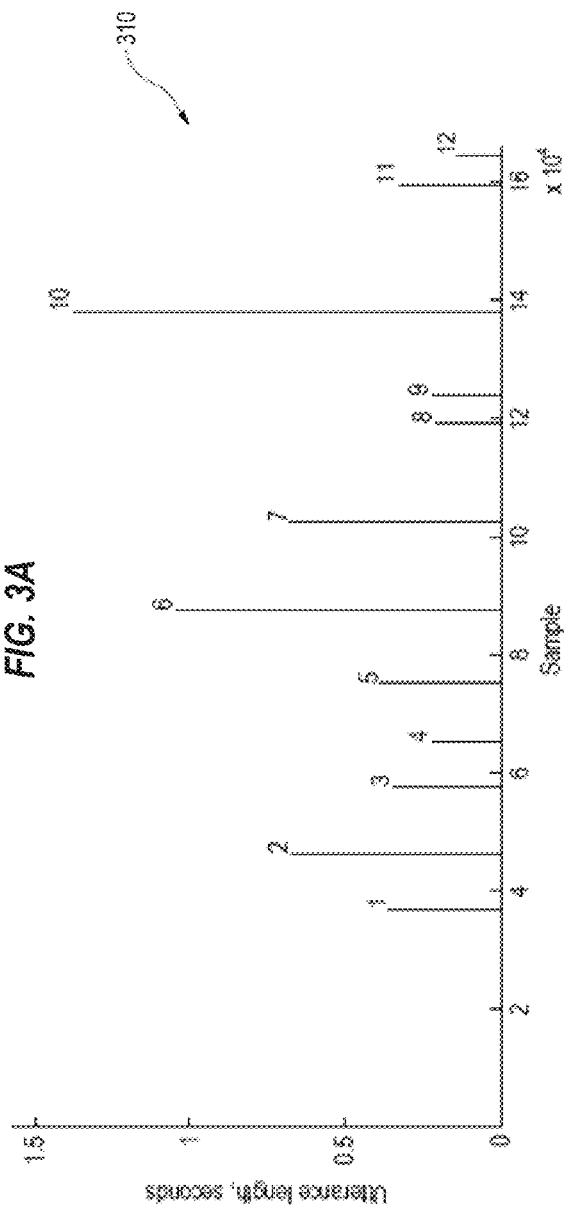

Referring now to FIGS. 3A and 3B, shown therein are graphs 300 and 310 illustrating processed audio signals which may be used to generate audio indicators 209B. Audio indicators 209B include information obtained from audio portions in the digital response data 132 of FIG. 1. The audio portions may include utterance pitch, duration, magnitude and other features. Graph 300 shows amplitudes of identified utterances 1-12 from a raw audio file, such as may be obtained from the recorded responses of a candidate from the digital response data 132. The large gap 302 at the beginning is before the candidate begins to speak. The numbered sections represent speaking utterances from the candidates with a corresponding utterance identifier (1-12) at the top in the order the utterances occurred. For example, utterance identifiers eight and nine are examples of filler words (e.g., uh, ah, um). Graph 310 of FIG. 3B shows a plot of magnitudes of the identified utterances and the corresponding utterance identifiers. The magnitude can be utterance lengths (e.g., in seconds or other units). Likewise, similar plots can be created for the gaps between the identified utterances. The digital evaluation platform 101 may provide for voice-to-text conversion that identifies individual utterances and identifies corresponding words. Many different technologies for converting the audio of the recorded responses to text may be used. Additionally, the digital evaluation platform 101 may provide text processing to gain information from the words spoken by the candidate. In some embodiments, the digital evaluation platform 101 may provide an indication as to the regional or national origin of candidates based on the audio file, or the processed audio data.

Figure 4:
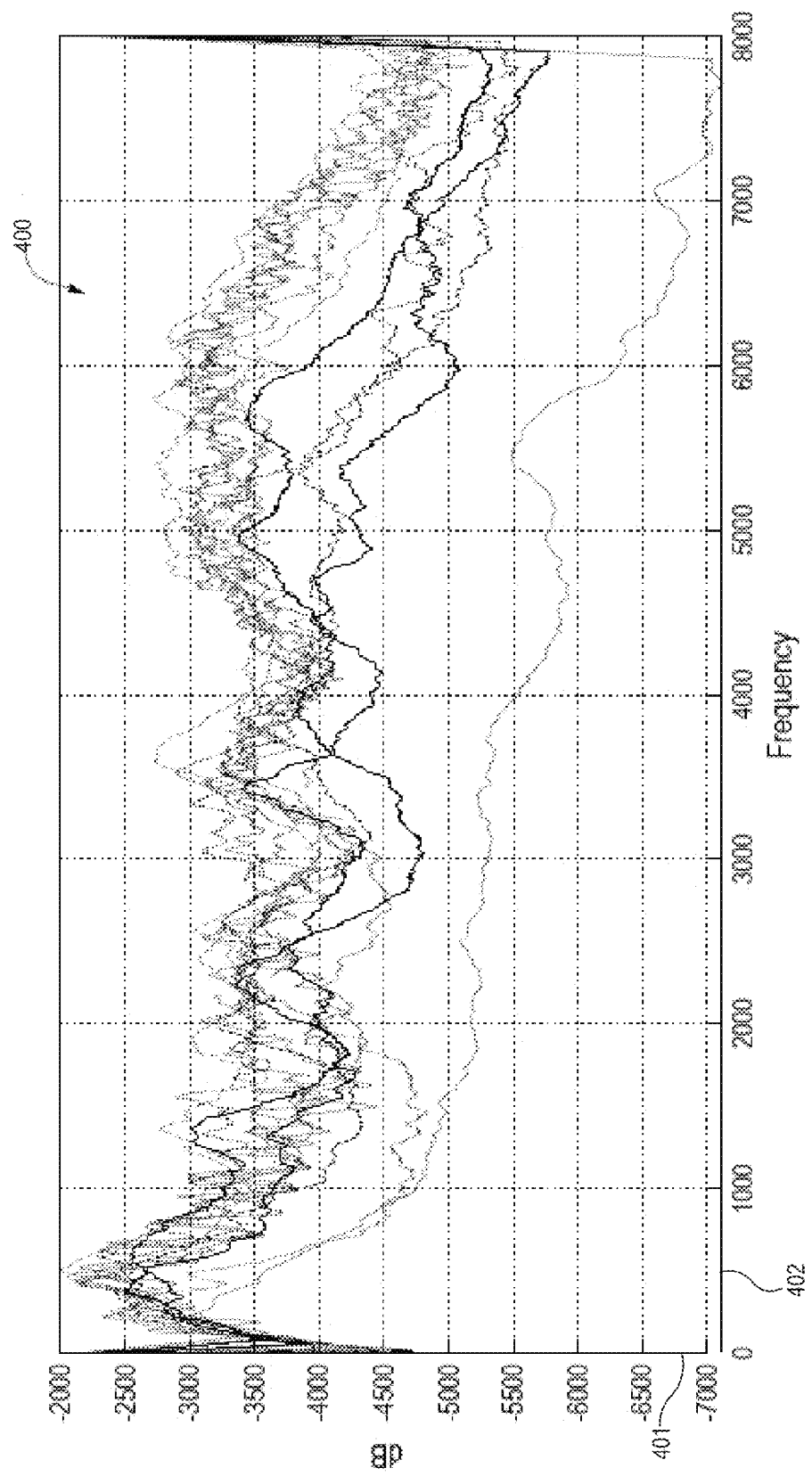
FIG. 4 is a graph of spectral analysis of identified utterances according to some embodiments.

FIG. 4 a graph 400 of spectral analysis of identified utterances according to some embodiments. The graph 400 shows the spectral analysis for each of the identified utterances illustrated in FIG. 3B. The spectral analysis can be used for a single word, one or more phrases, as well as for interview fingerprinting. The y axis of graph 400 is the power 401 and the x axis is the frequency 402. Using the same utterance segmentation method described above, spectral analysis can be completed on each utterance. Using the utterance time series data, the processing logic can compute summary statistics for each window within the spectrum. For example, each window may be defined by stepping 500 kHz (i.e., 1-500 kHz=window 1, 501-1000 kHz=window 2, etc.). Alternatively, other window sizes can be defined, and different frequency ranges can be evaluated. The summary statistics that were used on the spectral analysis may include max, min, median, skew, standard deviation, mode, slop, kurtosis, or other types of summary statistics.

By using the summary statistics and other methods, the audio indicators 209B may provide information that is statistically relevant in classifying candidates according to many different categories.

Referring now to FIGS. 5A-D, shown therein is a series of images illustrating how some information may be obtained from video frames of a candidate's response to produce some of the visual indicators 209C. The still image 500 of FIG. 5A shows an exemplary image from a recorded response, such as may be stored in the digital response data 132. As seen in the still image 500, the exemplary candidate 502 is shown approximately in the middle of the field of view. Because the process of performing a digital interview often includes a candidate recording responses from home, the still image 500 also includes a dresser 504 and a smoke alarm 506. In the process of evaluation candidates, those making decisions are inclined to use any information made accessing during or by the interview process. In a conventional, face-to-face interview, for example, an evaluator may be influenced by the clothes the candidate wears to the interview. Because the candidate 502 is able to recorded responses at home, many other features, like the dresser 504 and the smoke alarm 506 may be assessed. The environment in which candidates, like the candidate 502, are recorded may similarly influence evaluators. The environment may provide information as to candidate's socio-economic background. The digital evaluation platform 101 may collect information from the candidate 502 and the background in the still image 500 and process the information to generate visual indicators 209C. These indicators 209A may allow for the classification of candidates based on race, gender, ethnicity, sexual orientation, age, and socio-economic status.

To identify information that may be included in the visual indicators 209C, the still image 500 may undergo several processing steps. For example, when the video is in color, the still image 500 may be converted to a gray-scale image to facilitate certain kinds of processing. As shown in FIG. 5B, the still image 500 is enhanced to compensate for poor lighting conditions. More detail is apparent in the still image 500 of FIG. 5B than in the still image 500 of FIG. 5A. As shown in FIG. 5B an adaptive histogram equalization process has been performed to the still image 500. Many other enhancements may be used to prepare the still image 500 for more detailed image, such as facial recognition and mapping.

After enhancement as seen in FIG. 5B, a facial region 508 is identified by the digital evaluation platform 101 as seen in FIG. 5C. Many different techniques may be used to identify the facial region 508. For example, haar cascades may be used to determine the extent of the facial region 508. After identifying the facial region 508, more detailed processing of the face of the candidate 502 may be performed. Again, many different facial recognition techniques may be employed. As shown in FIG. 5C, an Eigenface approach is used. This approach provides a set of eigenvectors which may be compared with the still image 500 to detect the face. When the face is detected, the facial region 508 or a portion thereof may be provided to a secondary facial recognition system provided by the digital evaluation platform 101 for a similarity lookup.

With the face isolated, an Active Appearance Model (AAM) may be used to match and analyze the facial features of the candidate 502. The Active Appearance Model is a computer vision algorithm that includes a number of points that may be mapped onto the face to form a model of the face. Referring now to FIG. 5D, shown therein a close-up view of the facial region 508 As shown in FIG. 5D, the model 510 corresponds to the face of the candidate 502 and provides relative spacing between identified features. The relative spacings of the model 510 may be used to provide some of the visual indicators 209C. Additionally, the model 510 may be used to identify areas of the head and face of the candidate 502 that may be analyzed in various ways. For example, an eye color of the candidate 502 may be obtained. Additional visual indicators 209C may include indicators for skin tone and hair color in addition to eye color. These tones and colors may be expressed as individual red-green-blue (RGB) component values.

The visual indicators 209C may be combined with the categorical indicators 209A and the audio indicators 209B to produce a combined vector representation of multiple candidates, with each row representing a single candidate "n" in a matrix $X_n$. An example of such a matrix $X_n$ is seen below:

understood as characteristics of the evaluation candidates. Thus, the median green skin value of candidate may be one of many characteristics extracted from the indicators 209A-C for a given candidate.

Another matrix, matrix Y, may be provided for training purposes. In some embodiments, the matrix Y may be obtained from some of the categorical indicators 209A provided directly by the candidates. In some embodiments, the matrix Y includes multiple columns, one for each classification of candidates. Thus, embodiments of the matrix Y may include a column for gender or sex, race, age, etc. In some embodiments, the matrix Y may include only a single column with an entry for each of the candidates in the matrix $X_n$, as shown below:

$$Y = \begin{bmatrix} \text{sex} \\ \text{female} \\ \text{male} \\ \text{male} \\ \text{female} \\ \vdots \\ \text{female} \end{bmatrix} = \begin{bmatrix} \text{race} \\ \text{hispanic} \\ \text{american indian} \\ \text{white} \\ \text{asian} \\ \vdots \\ \text{indian} \end{bmatrix} = \begin{bmatrix} \text{age} \\ >50 \\ 30\text{-}50 \\ <30 \\ <30 \\ \vdots \\ 30\text{-}50 \end{bmatrix}$$

In some embodiments, the age values may be estimated by evaluators, and thus may be indicated as part of a range of ranges rather than specific ages.

Given the matrices $X_n$ and Y, a model may be identified and trained using various methods such as regression, support vector machines, deep learning, genetic programming, or another suitable regression of classification technique.

These matrices $X_n$ and Y may be provided to the classification module 208, which receives characteristics of the matrix $X_n$ as an input to classify the candidates whose characteristics are included in the matrix $X_n$. When the matrix $X_n$ and Y are provided are a historical data set for training purposes, the classification module 208 may pro-

| | median-skin-red-value | median-skin-green-value | median-skin-blue-value | eigen-face-component-1 | eigen-face-component-1000 | median-iris-red-value | median-hair-blue-value | skew (PSD $(\text{audio})_{1\text{-}500}$) | max (PSD $(\text{audio})_{501\text{-}1000}$) | etc. |
|---|---|---|---|---|---|---|---|---|---|---|
| $X_n =$ | 0.71 | 0.83 | 0.86 | 0.55 | 0.70 | 0.55 | 0.64 | 0.56 | 0.85 | ... |
| | 0.38 | 0.47 | 0.69 | 0.95 | 0.19 | 0.05 | 0.29 | 0.55 | 0.18 | ... |
| | 0.61 | 0.11 | 0.93 | 0.19 | 0.78 | 0.77 | 0.44 | 0.43 | 0.30 | ... |
| | 0.23 | 0.65 | 0.91 | 0.70 | 0.97 | 0.44 | 0.84 | 0.43 | 0.08 | ... |
| | 0.06 | 0.43 | 0.41 | 0.29 | 0.37 | 0.13 | 0.62 | 0.37 | 0.05 | ... |
| | 0.06 | 0.63 | 0.82 | 0.29 | 0.35 | 0.38 | 0.85 | 0.41 | 0.69 | ... |
| | ⋮ | ⋮ | ⋮ | ⋮ | ⋮ | ⋮ | ⋮ | ⋮ | ⋮ | ... |
| | 0.28 | 0.38 | 0.35 | 0.63 | 0.82 | 0.32 | 0.57 | 0.72 | 0.62 | ... |

As seen in the matrix $X_n$, each row includes indicators 209A-C for a single candidate. Only some of the indicators 209A-C are shown in matrix $X_n$. As shown in the matrix $X_n$ above, the components are expressed as scaled values from zero to one. The normalization and scaling of inputs to the matrix $X_n$ may reduce the likelihood that a large input may have on the model relative to a smaller input value. Each column may be scaled by its maximum value in some embodiments. The components of the matrix $X_n$ may be vide the model by which subsequent characteristics from candidates may be used to classify those candidates. Because the classifications may be provided explicitly in such circumstances, this may be understood as a supervised learning approach.

In some embodiments, an unsupervised learning approach may be used. In such an approach, the Y matrix may not be included or may be included as part of the input data. In such an approach, the classification module 208 may receive in the input set and cluster similar individuals using k-means clustering, k-harmonic means, k-harmonic means with optimization, or another unsupervised classification algorithm. The classification module 208 may also receive a cluster number input, which indicates the number of clusters that are permitted by the classification module 208 in performing the classification of candidates. An example of such an unsupervised learning approach may be found in the plot 600 of FIG. 6.

Figure 6:
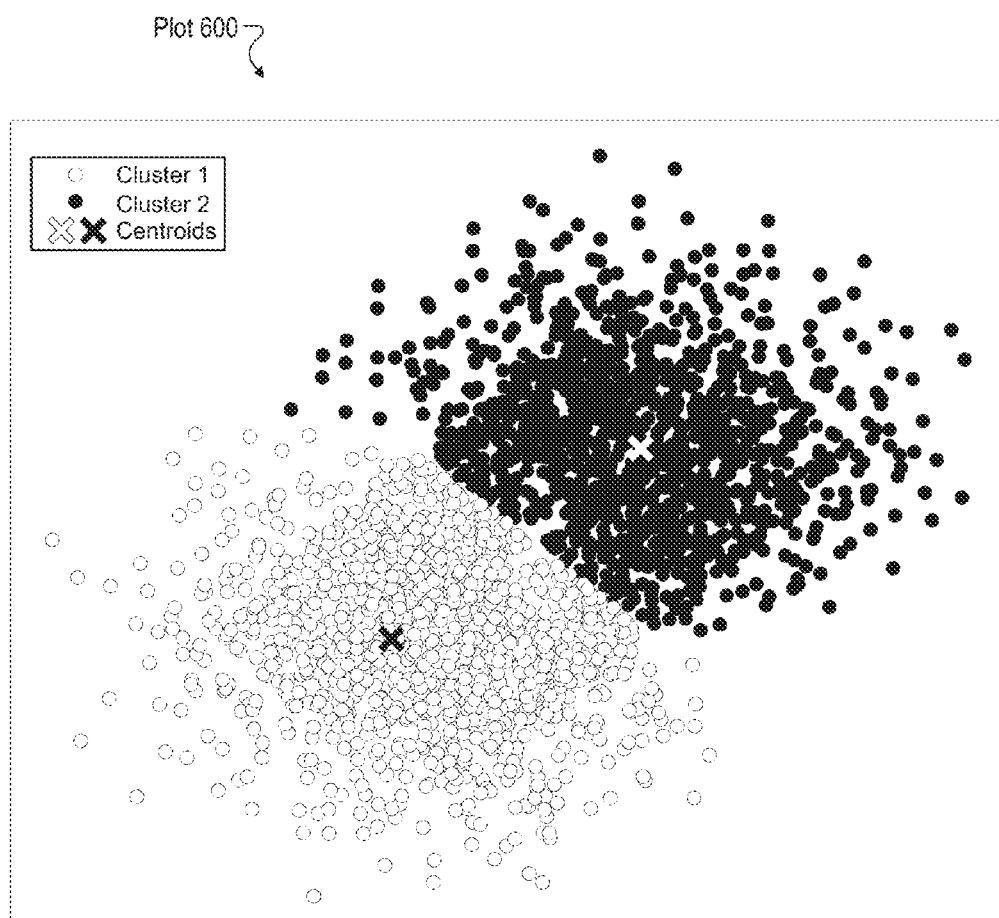
FIG. 6 is plot showing the output of an unsupervised clustering approach to identifying bias according to some embodiments.

As shown in FIG. 6, the plot 600 includes two clusters, cluster 1 and cluster 2. Thus, the classification module 208 received input indicating that two clusters should be produced from the modelling process. The modelling process produces the most decisive clustering into two clusters. The unsupervised learning approach may allow for the identification of untracked physical biases, such as personal weight or hair color. After the clustering by the classification module 208 is finalized, a supervisor may view members of each cluster to assess the quality or qualities upon which the clusters 1 and 2 are based. For example, as seen in plot 600, the candidates are clustered according to whether they are male or female. When more than two clusters are requested as input to the classification module 208, qualities that are not binary may be the basis for clustering.

After the classification module 208 receives the indicators 209A, 209B, and 209C, the classifications may be provided to the bias detection module 210 of the bias detection tool 110. The bias detection tool 110 may process the indicators 209A-C and the evaluation data 212 to determine whether a bias is present on the part of at least one of the evaluators with respect to at least one of the characteristics of the candidates. When statistical support is found to suggest that a bias is present, the bias detection module 210 may provide a notification to a supervisor that is associated with the particular evaluation campaign in the campaign data 139 of FIG. 1. The notification may be setup by the supervisor or by default to be sent in the form of an email or a text-message to the supervisor or to other recipients. Additionally, the GUI engine 206 may display a notification in a user interface provided for the bias detection tool 110 and the digital evaluation platform 101. Thus, when an evaluator is determined to be outside the mean by a threshold value, a notification may be generated and sent. The threshold value may be a dynamic value that adjusts based on a variety of factors, such as sample size, the available candidate pool, and/or a confidence value.

Figure 7:
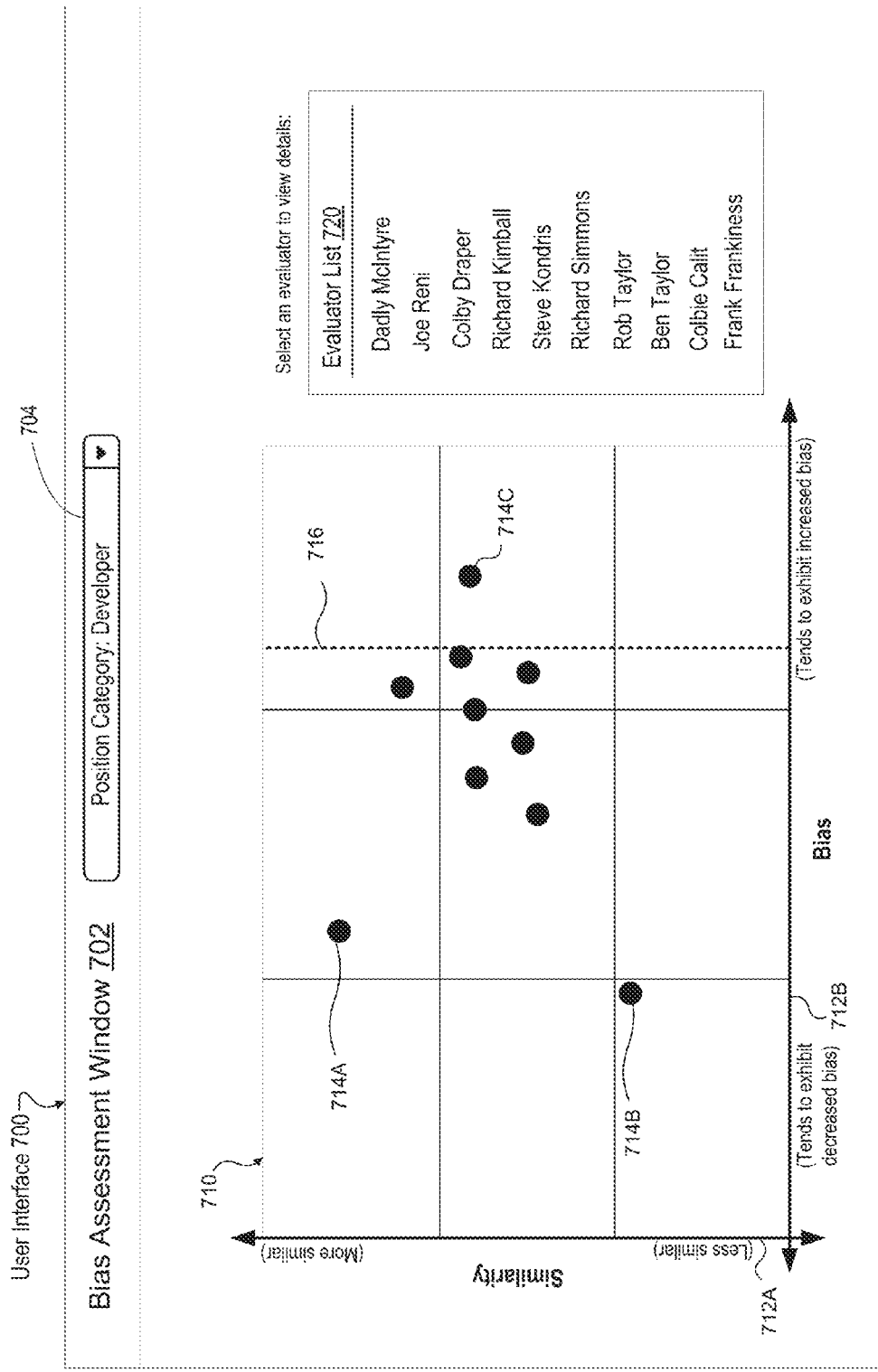
FIG. 7 is an exemplary graphical user interface for assessing evaluator bias according to some embodiments.

FIG. 7 illustrates an exemplary graphical user interface 700 for assessing evaluator bias according to some embodiments. The user interface 700 includes a bias assessment window 702, and a drop-down selector element 704 that permits a supervisor, a compliance offer, or another person with access to the bias detection tool 110 to select an individual position, a position category (as shown in FIG. 7), a division, or an entire company for bias detection analysis. As illustrated in FIG. 7, the bias assessment window 702 displays relevant data for the position category of "developer." The bias detection tool 110 can compare the evaluation behaviors of a set of evaluators according to various criteria and assess how similar evaluators' recommendations and/or ratings are.

The user interface 700 includes a plot 710 that compares multiple evaluators in terms of their exhibited bias and their similarity to other evaluators. As shown in FIG. 7, the plot 710 is based on the recommendations provided by the evaluators, which is accessed by the bias detection module 210 of the bias detection tool 110 from the evaluation data 212. The plot 710 may be a two-dimensional plot, or may further include a third-dimension of data by varying the points used to represent evaluators on the graph. The x-axis 712A of the plot 710 orders the points, such as exemplary points 714A, 714B, and 714C, that represent evaluators according to how biased the evaluator is. The y-axis 712B orders the points according to the similarity of the evaluators.

Each of the evaluators listed in the evaluator list 720, as illustrated in FIG. 7 is represented by a point in the plot 710. The evaluator represented by point 714A exhibits slightly less bias than the evaluator represented by point 714A, but is much less similar to the other evaluators. The plot 710 also includes a threshold line 716. Because most evaluators will exhibit a degree of bias in some aspects, the threshold line 716 may be used to indicate the amount of bias that may not require action, for example, an evaluator may be biased in favor of fellow alums. As shown in FIG. 7, the evaluator represented by point 714C is to the right of the threshold line 716. A supervisor or compliance offer may be prompted by a user interface element provided by the GUI engine 206 to comment. The supervisor may comment with information explaining actions to be taken or actions that are to be taken to address the bias. Or the supervisor may comment as to why the detected bias does not require action to be taken.

When a user selects either a name on the evaluator list 720 or a point on the plot 710, a tooltip may be provided by the GUI engine 206 that provide information from the evaluation 212 of other data accessible on the data store 130.

Figure 8:
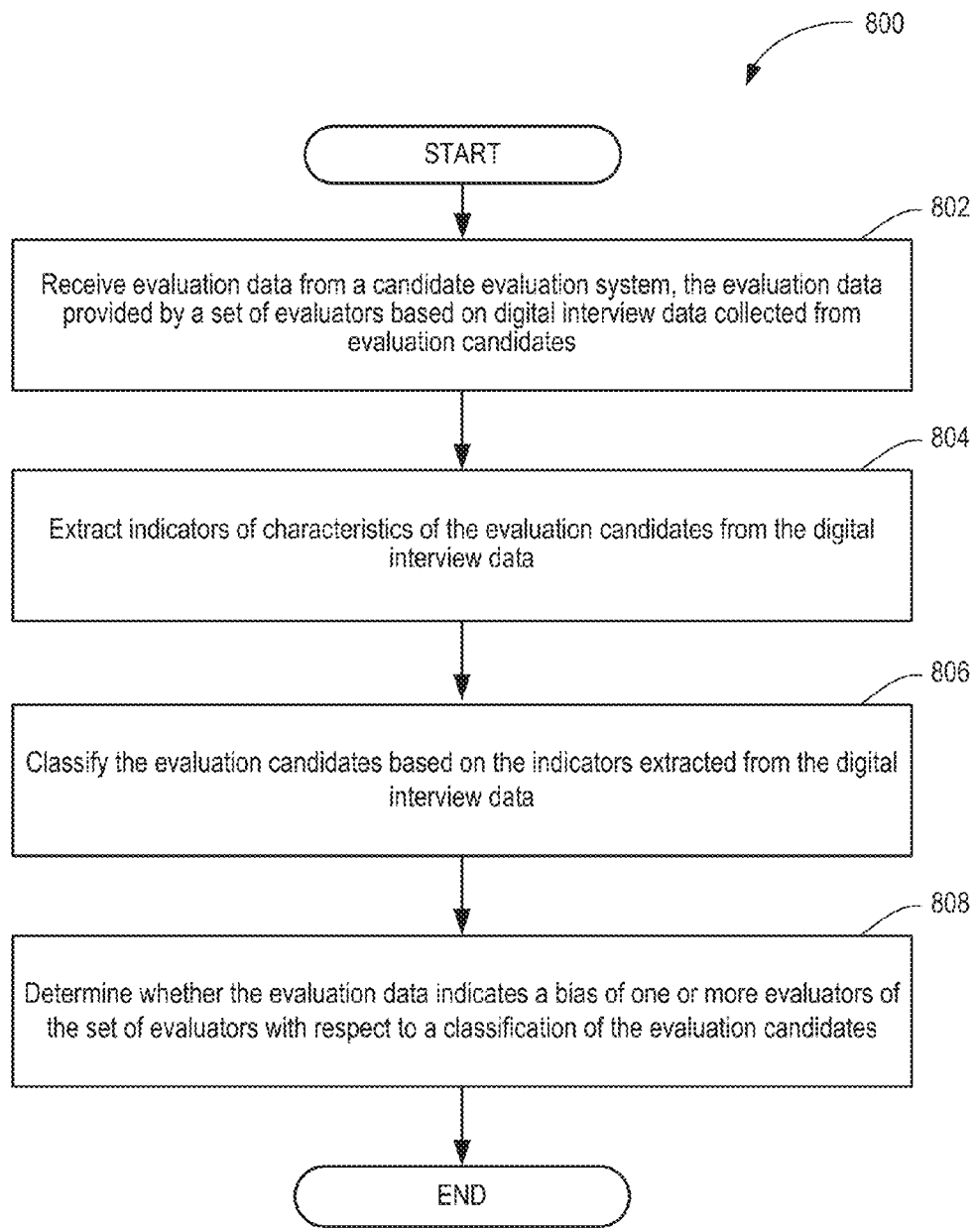
FIG. 8 is a flow diagram of a method of assessing evaluator bias according to some embodiments.

FIG. 8 is a flow diagram illustrating a method 800 for detecting bias in a set of evaluation data, according to some embodiments of the present disclosure. The method 800 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 800 and other methods of this disclosure may be depicted and described as a series of acts or operations. However, operations in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on a non-transitory, tangible, computer-readable medium to facilitate transporting and transferring such methods to computing devices.

Thus, FIG. 8 illustrates an embodiment of the method 800, which begins at block 802 in which the processing receives evaluation data from a candidate evaluation system. The evaluation data may be provided by a set of evaluators based on digital interview collected from evaluation candidates. The evaluation data may be the evaluation data 212 of FIG. 2, which may include the ratings data 134 and the recommendation data 136 as illustrated in FIG. 1. In some embodiments, the evaluation data may include the digital response data 132. This information may be received by the bias detection module 210 of the bias detection tool 110.

At block 804, the processing logic may extract characteristics of the evaluation candidates from the digital interview data. For example, characteristics may be extracted from the digital interview data, such as the digital interview data response data 132. As described herein, categorical indicators 209A may include indicators provided explicitly by the evaluation candidates. Such indicators may include names, places of residence, identifiers of devices use in providing recorded responses and/or written responses to the digital evaluation platform 101, etc. Other indicators include audio indicators 209B, which may include pitch, speech rate, and accent, in addition to text obtained from the audio data of the recorded responses using voice-to-text technologies. Visual indicators 209C may also be included. The visual indicators 209C may include relative dimensions or spacings of facial features of the evaluation candidates, as well as information regarding the skin tone, hair color, and eye color of evaluation candidates. The indicators 209A-C may be provided to the classification module 208 of the bias detection tool 110, which may process the indicators.

At block 806, the processing logic classifies the evaluation candidates based on the characteristics of the candidate extracted from the digital interview data. This may be done by the classification module 208 in multiple ways as described herein. For example, the indicators 209A may be provided to a trained model provided by the classification model. The model may have been trained earlier using a set of indicators represented by matrix and a set of classifications Y, as described herein. After the model of the classification module 208 is trained, indicators associated with specific candidates may be used to classify the candidates according to race, gender, ethnicity, sexual orientation, age, socioeconomic status, etc. In some embodiments, unsupervised learning algorithms may be used. As shown in plot 600 of FIG. 6, the set of indicators may be provided to a clustering algorithm along with an input to define the number of clusters. The unsupervised learning algorithms provided by the classification module 208 may sort the candidates into clusters, which may then be assessed by a supervisor to determine the characteristics upon which the clustering occurred. For example, the clustering may occur based on whether candidates are male or female as shown in plot 600. In some embodiments, candidates may be clustered according to race or another non-binary value. Using either a supervised (training-based) algorithm or an unsupervised algorithm, the classification module 208 may receive the indicators for the set of candidates and classify the candidates in terms of classifications that may be subject to bias in the evaluation process.

At block 808, the processing logic may determine whether the evaluation data indicates a bias of one or more evaluators of the set of evaluators with respect to one or more of the classifications of the evaluation candidates. This may be done based on statistical modeling of the various classifications of the candidates. For example, the four-fifths rule may be used by determining the classification in a category, such as race, that receives the highest recommendations and checking to see whether other race classifications perform at least 80% as well in the recommendations as that group. Many similar tests may be used. For example, if an age classification, such as candidates estimated to be over 50 years old, receives statistically significantly lower marks on ratings of by a particular evaluator, this evaluator may be flagged to a supervisor as having a potential bias. By having information regarding potential bias, interventions may be undertaken to address and eliminate any biases. As described herein, when a potential bias is detected by the bias detection tool 110, the bias detection tool 110 may provide a notification to a supervisor or another party regarding the potential bias. In some embodiments, the GUI engine 206 of the bias detection tool 110 may provide for a comment user element by which a supervisor or compliance officer may comment on the potential bias. The comments may indicate actions taken or may indicate why the potential bias is not actual bias.

The bias detection tool 110, and its components as described herein, can be used to assess potential biases that may be introduced by evaluators in the subjective aspects of a digital evaluation process. The bias detection tool 110 may prevent a company that has faced problems of bias from repeating such problems and may allow the company, or a third-party, to easy monitor the company's performance in this regard. Companies that have not faced problems, perceived or actual, with different types of bias may be able to detect potential bias and address it early.

Figure 9:
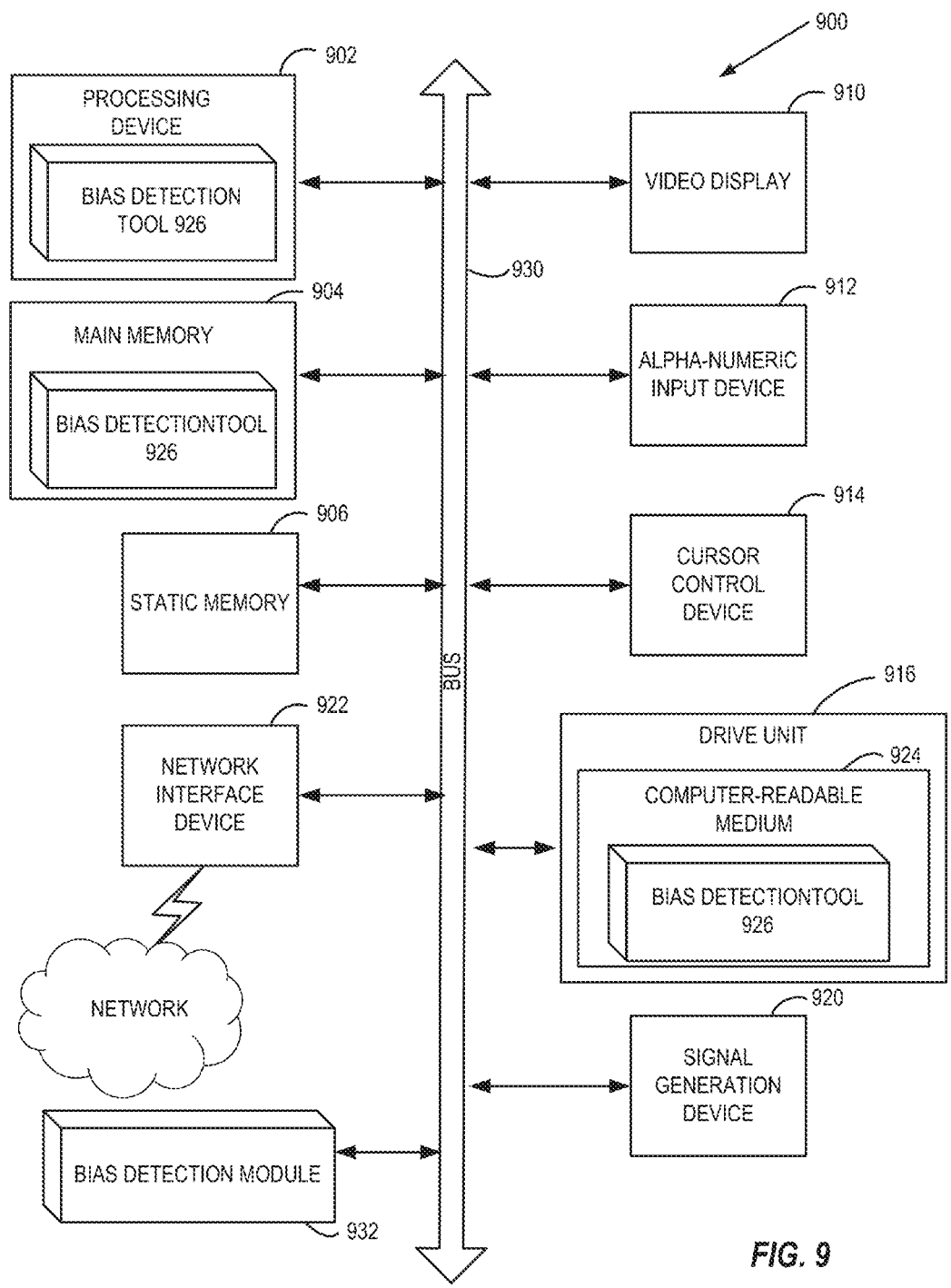
FIG. 9 illustrates a diagrammatic representation of a machine in the exemplary form of a computing system for model-assisted evaluation and intelligent interview feedback according to an embodiment.

FIG. 9 illustrates a diagrammatic representation of a machine in the exemplary form of a computing system for bias detection. Within the computing system 900 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for bias detection, including classification of candidates, for evaluating digital interviews and other assessment or evaluations and the evaluators for bias, such as embodiments of the method 800 as described above. In one embodiment, the computing system 900 represents various components that may be implemented in the server computing system 104 as described above. Alternatively, the server computing system 104 may include more or less components as illustrated in the computing system 900.

The exemplary computing system 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a data storage device 916, each of which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the processing logic (e.g., bias detection tool 926) for performing the operations and steps discussed herein.

The computing system 900 may further include a network interface device 922. The computing system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable storage medium 924 on which is stored one or more sets of instructions (e.g., bias detection tool 926) embodying any one or more of the methodologies or functions described herein. The bias detection tool 926 may also reside, completely or at least partially, within the main memory 904 and/or within the processing device 902 during execution thereof by the computing system 900, the main memory 904 and the processing device 902 also constituting computer-readable storage media. The bias detection tool 926 may further be transmitted or received over a network via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The bias detection tool, components, and other features described herein can be implemented as discrete hardware components or integrated in the functionality of hardware components such as ASICS, FPGAs, DSPs, or similar devices. The bias detection module 932 may implement operations of bias detection as described herein. In addition, the bias detection module 932 can be implemented as firmware or functional circuitry within hardware devices. Further, the bias detection module 932 can be implemented in any combination hardware devices and software components.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "analyzing," "capturing," "executing," "extracting," "specifying," "selecting," "classifying," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present disclosure also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the scope of the disclosure to the precise forms disclosed. Many modifications and variations are possible in view of the above teachings. The embodiments were chosen and described in order to best explain the principles of the disclosure and its practical applications, to thereby enable others skilled in the art to utilize the disclosure and various embodiments with various modifications as may be suited to the particular use contemplated.

What is claimed is:

1. A method comprising:
   receiving, at a human bias detection tool executed by a first computing device of a digital interviewing platform, user input from a second computing device over a network, the user input comprising a selection of a set of digital interviews of first candidates in a hiring process to monitor for and detect a metric of disparate impact, caused by an evaluator's bias that exceeds a specified limit in the hiring process;
   retrieving, by the human bias detection tool, evaluation data from a data storage device of the digital interviewing platform, the evaluation data generated with respect to a set of evaluators by evaluating recorded video responses of the first candidates to questions asked during the hiring process;
   retrieving, by the human bias detection tool from the data storage device, video frames of at least a portion of the recorded video of responses of the first candidates;
   performing, by the human bias detection tool, video analysis on the video frames to identify visual indicators of faces of the first candidates, wherein the visual indicators comprise relative spacing between identified features of the faces of the first candidates;
   combining, by the human bias detection tool, the visual indicators with an audio indicator and a categorical indicator that further characterizes respective first candidates, to generate a combined vector representation of the first candidates;

performing, by the human bias detection tool, supervised learning of the combined vector representation of the first candidates with respect to one or more classifications of the first candidates, to train a classification model;

applying, by the human bias detection tool, the classification model to second indicators captured of second candidates to classify the second candidates according to a protected class, wherein the second indicators comprise one or more of a second visual indicator, a second audio indicator, or a second categorical indicator of respective second candidates;

determining, by the human bias detection tool, whether evaluation data for the second candidates indicates a disparate impact of one or more evaluators of the set of evaluators with respect to classifications of the second candidates according to the protected class, wherein the determining whether the evaluation data indicates the disparate impact comprises performing a relative selection rate analysis with respect to the classifications to obtain a metric of disparate impact reflected in the evaluation data for the second candidates;

determining, by the human bias detection tool, that the metric of the disparate impact exceeds a specified limit of relative selection rate to other groups in the hiring process, the specified limit being less than 80% of a normal selection rate, which is a limit enforced for the protected class;

generating, by the human bias detection tool, a notification containing information regarding the determination that the metric of disparate impact exceeds the specified limit in the hiring process; and sending, by the human bias detection tool, the notification to the second computing device over the network.

2. The method of claim 1, further comprising transmitting the notification regarding the determination as at least one of a text message or an email to a computing device of an evaluation supervisor of the hiring process.

3. The method of claim 2, wherein the information regarding the determination indicates a potential violation of an anti-discrimination law.

4. The method of claim 2, wherein generating the notification further comprises generating the information to indicate a deviation from a modeled outcome, the modeled outcome modeling results of a second set of evaluators having a metric of disparate impact that does not exceed the specified limit.

5. The method of claim 1, wherein performing the supervised learning of the combined vector representation of the first candidates comprises supplying a matrix having a column per classification of the first candidates, wherein the one or more classifications comprise at least one of race, gender, religion, ethnicity, sexual orientation, age, or socio-economic status.

6. The method of claim 1, wherein the performing the video analysis further comprises:
extracting additional visual indicators of human characteristics of the first candidates; and
combining the additional visual indicators with the categorical indicator and the audio indicator.

7. The method of claim 1, further comprising:
transmitting, by the first computing device, first data over the network to the second computing device, the first data causing the second computing device to display a first graphical user interface (GUI) element containing the notification;

transmitting, by the first computing device, second data over the network to the second computing device, the second data causing the second computing device to display a second GUI element that when activated causes the second computing device to display a prompt for additional information associated with the determination that the metric of disparate impact exceeds the specified limit in the hiring process, wherein the additional information comprises at least one of a confirmation of the determination, a rejection of the determination, or a list of actions to be taken to address the determination; and receiving, at the first computing device over the network from the user interface of the second computing device, the additional information associated with the determination.

8. A digital evaluation platform comprising:
a data storage device to store evaluation data provided by a set of evaluators in response to evaluating recorded video of responses of first candidates to questions asked during a hiring process; and
a server device, coupled to the data storage device, to execute a human bias detection tool to:
receive user input from a second computing device over a network, the user input comprising a selection of a set of digital interviews of first candidates in a hiring process to monitor for and detect a metric of disparate impact, caused by an evaluator's bias that exceeds a specified limit in the hiring process;
retrieve the evaluation data from the data storage device;
retrieve video frames of at least a portion of the recorded video of responses the first candidates from the data storage device;
perform video analysis on the video frames to identify visual indicators of faces of the first candidates, wherein the visual indicators comprise relative spacing between identified features of the faces of the first candidates;
combine the visual indicators with an audio indicator and a categorical indicator that further characterizes respective first candidates, to generate a combined vector representation of the first candidates;
perform supervised learning of the combined vector representation of the first candidates with respect to one or more classifications of the first candidates, to train a classification model;
apply the classification model to second indicators captured of second candidates to classify the second candidates according to a protected class, wherein the second indicators comprise one or more of a second visual indicator, a second audio indicator, or a second categorical indicator of respective second candidates;
determine whether evaluation data for the second candidates indicates a disparate impact of one or more evaluators of the set of evaluators with respect to classifications of the second candidates according to the protected class, wherein to determine whether the evaluation data indicates the disparate impact comprises performing a relative selection rate analysis with respect to the classifications to obtain a metric of disparate impact reflected in the evaluation data for the second candidates;
determine that the metric of the disparate impact exceeds a specified limit of relative selection rate to other groups in the hiring process, the specified limit being less than 80% of a normal selection rate, which is a limit enforced for the protected class;

generate a notification containing information regarding the determination that the metric of disparate impact exceeds the specified limit in the hiring process; and send the notification to the second computing device over the network.

9. The digital evaluation platform of claim 8, wherein the server device is further to transmit the notification as at least one of a text message or an email to a computing device of an evaluation supervisor of the hiring process, the information regarding the determination indicating a deviation from a modeled outcome, the modeled outcome modeling results of a second set of evaluators having a metric of disparate impact that does not exceed the specified limit.

10. The digital evaluation platform of claim 8, wherein to perform the supervised learning of the combined vector representation of the first candidates comprises supplying a matrix having a column per classification of the first candidates, wherein the one or more classifications comprise at least one of race, gender, religion, ethnicity, sexual orientation, age, or socioeconomic status.

11. The digital evaluation platform of claim 8, wherein the human bias detection tool is further to:
    extract additional visual indicators of human characteristics of the first candidates; and
    combine the additional visual indicators with the categorical indicator and audio indicator from the.

12. The digital evaluation platform of claim 8, wherein the server device is further to:
    transmit first data over the network to the second computing device, the first data causing the second computing device to display a first graphical user interface (GUI) element containing the notification;
    transmit second data over the network to the second computing device, the second data causing the second computing device to display a second GUI element that when activated causes the second computing device to display a prompt for additional information associated with the determination that the metric of disparate impact exceeds the specified limit in the hiring process, wherein the additional information comprises at least one of a confirmation of the determination, a rejection of the determination, or a list of actions to be taken to address the determination; and
    receive over the network from the user interface of the second computing device the additional information associated with the determination.

13. A non-transitory computer-readable storage medium storing instructions that, when executed by a processing device, cause the processing device to perform operations comprising:
    receiving, at a human bias detection tool executed by the processing device of a digital interviewing platform, user input from a second computing device over a network, the user input comprising a selection of a set of digital interviews of first candidates in a hiring process to monitor for and detect a metric of disparate impact, caused by an evaluator's bias that exceeds a specified limit in the hiring process;
    retrieving, by the human bias detection tool, evaluation data from a data storage device of the digital interviewing platform, the evaluation data provided by a set of evaluators in response to evaluating recorded video of responses of the first candidates to questions asked during the hiring process;
    retrieving, by the human bias detection tool, video frames of at least a portion of the recorded video of responses of the first candidates from the data storage device of the digital interviewing platform;
    performing, by the human bias detection tool, video analysis on the video frames to identify visual indicators of faces of the first candidates, wherein the visual indicators comprise relative spacing between identified features of the faces of the first candidates;
    combining, by the human bias detection tool, the visual indicators with an audio indicator and a categorical indicator that further characterizes respective first candidates, to generate a combined vector representation of the first candidates;
    performing, by the human bias detection tool, supervised learning of the combined vector representation of the first candidates with respect to one or more classifications of the first candidates, to train a classification model;
    applying, by the human bias detection tool, the classification model to second indicators captured of second candidates to classify the second candidates according to a protected class, wherein the second indicators comprise one or more of a second visual indicator, a second audio indicator, or a second categorical indicator of respective second candidates;
    determining, by the human bias detection tool, whether evaluation data for the second candidates indicates a disparate impact of one or more evaluators of the set of evaluators with respect to classifications of the second candidates according to the protected class, wherein the determining whether the evaluation data indicates the disparate impact comprises performing a relative selection rate analysis with respect to the classifications to obtain a metric of disparate impact reflected in the evaluation data for the second candidates;
    determining, by the human bias detection tool, that the metric of the disparate impact exceeds a specified limit of relative selection rate to other groups in the hiring process, the specified limit being less than 80% of a normal selection rate, which is a limit enforced for the protected class;
    generating, by the human bias detection tool, a notification containing information regarding the determination that the metric of disparate impact exceeds the specified limit in the hiring process; and
    sending, by the human bias detection tool, the notification to the second computing device over the network.

14. The non-transitory computer-readable storage medium of claim 13, wherein the operations further comprises transmitting the notification as at least one of a text message or an email to a computing device of an evaluation supervisor of the hiring process.

15. The non-transitory computer-readable storage medium of claim 14, wherein the information regarding the determination indicates a deviation from a modeled outcome, the modeled outcome modeling results of a second set of evaluators having a metric of disparate impact that does not exceed the specified limit.

16. The non-transitory computer-readable storage medium of claim 13, wherein performing the supervised learning of the combined vector representation of the first candidates comprises supplying a matrix having a column per classification of the first candidates, wherein the one or more classifications comprise at least one of race, gender, religion, ethnicity, sexual orientation, age, or socioeconomic status.

17. The non-transitory computer-readable storage medium of claim 13, wherein the performing the video analysis further comprises extracting additional visual indicators of human characteristics of the candidates and combining the additional visual indicators with the categorical indicator and the audio indicator.

18. The non-transitory computer-readable storage medium of claim 13, wherein the operations further comprise:
- transmitting, by the processing device, first data over the network to the second computing device, the first data causing the second computing device to display a first graphical user interface (GUI) element containing the notification;
- transmitting, by the processing device, second data over the network to the second computing device, the second data causing the second computing device to display a second GUI element that when activated causes the second computing device to display a prompt for additional information associated with the determination that the metric of disparate impact exceeds the specified limit in the hiring process, wherein the additional information comprises at least one of a confirmation of the determination, a rejection of the determination, or a list of actions to be taken to address the determination; and
- receiving, at the processing device over the network from the user interface of the second computing device, the additional information associated with the determination.

* * * * *